(12) United States Patent
Witte

(10) Patent No.: US 11,906,091 B2
(45) Date of Patent: Feb. 20, 2024

(54) HYDRAULIC COUPLING SYSTEM

(71) Applicant: Top Hydraulics, Inc., Florence, OR (US)

(72) Inventor: Klaus H. Witte, Florence, OR (US)

(73) Assignee: TOP HYDRAULICS, INC., Florence, OR (US)

(*) Notice: Subject to any disclaimer, the term of this patent is extended or adjusted under 35 U.S.C. 154(b) by 62 days.

(21) Appl. No.: 17/338,988

(22) Filed: Jun. 4, 2021

(65) Prior Publication Data

US 2021/0381629 A1 Dec. 9, 2021

Related U.S. Application Data

(60) Provisional application No. 63/035,404, filed on Jun. 5, 2020.

(51) Int. Cl.
  *F16L 33/207* (2006.01)
(52) U.S. Cl.
  CPC ................... *F16L 33/2073* (2013.01)
(58) Field of Classification Search
  CPC . F16L 33/2073; F16L 33/207; F16L 33/2071; F16L 33/20; F16L 33/226; F16L 33/224; F16L 33/223; F16L 33/222
  USPC .......... 285/331, 256, 251, 353, 354
  See application file for complete search history.

(56) References Cited

U.S. PATENT DOCUMENTS

| | | | |
|---|---|---|---|
| 2,001,204 A * | 5/1935 | Long | |
| 2,034,644 A * | 3/1936 | Walsh | F16L 33/2073 |
| 2,328,013 A | 8/1943 | Hattan | |
| 2,420,617 A * | 5/1947 | Paquin | F16L 33/222 |
| 2,446,599 A * | 8/1948 | Knaggs | F16L 33/222 |
| 2,472,455 A * | 6/1949 | Ansingh | F16L 33/222 |
| 3,843,169 A * | 10/1974 | Wise | F16L 33/224 |
| 4,212,487 A | 7/1980 | Jones et al. | |
| 2004/0012198 A1 | 1/2004 | Brotzell et al. | |
| 2011/0215567 A1* | 9/2011 | Hurwitz | 285/256 |

(Continued)

FOREIGN PATENT DOCUMENTS

DE 202007010417 U1 12/2008
DE 202007010417 U1 * 1/2009

OTHER PUBLICATIONS

International Search Report and Written Opinion issued in related Application Serial No. PCT/US2021/035859 dated Oct. 4, 2021.

*Primary Examiner* — William S. Choi
(74) *Attorney, Agent, or Firm* — Brian J. Colandreo; Jeffery T. Placker; Holland & Knight LLP

(57) ABSTRACT

A hydraulic coupling system is configured to couple a hydraulic hose to a hydraulic cylinder and includes: a compressive adapter assembly including: a first adapter portion configured to receive a portion of the hydraulic hose, and a second adapter portion configured to engage an inlet tube of the hydraulic cylinder, wherein a first tube portion of the inlet tube of the hydraulic cylinder is configured to be received within a portion of the hydraulic hose; and a compressive sleeve assembly configured to engage the compressive adapter assembly and radially compress the first adapter portion of the compressive adapter assembly onto an outer surface of the portion of the hydraulic hose, thus compressing an inner surface of the portion of the hydraulic hose onto the first tube portion of the inlet tube of the hydraulic cylinder.

22 Claims, 4 Drawing Sheets

(56) References Cited

U.S. PATENT DOCUMENTS

2014/0252760 A1* 9/2014 Paul ................... F16L 33/224
  285/256
2016/0273693 A1 9/2016 Considine, Jr. et al.
2020/0049292 A1* 2/2020 Ferkel ................... F16L 33/20

* cited by examiner

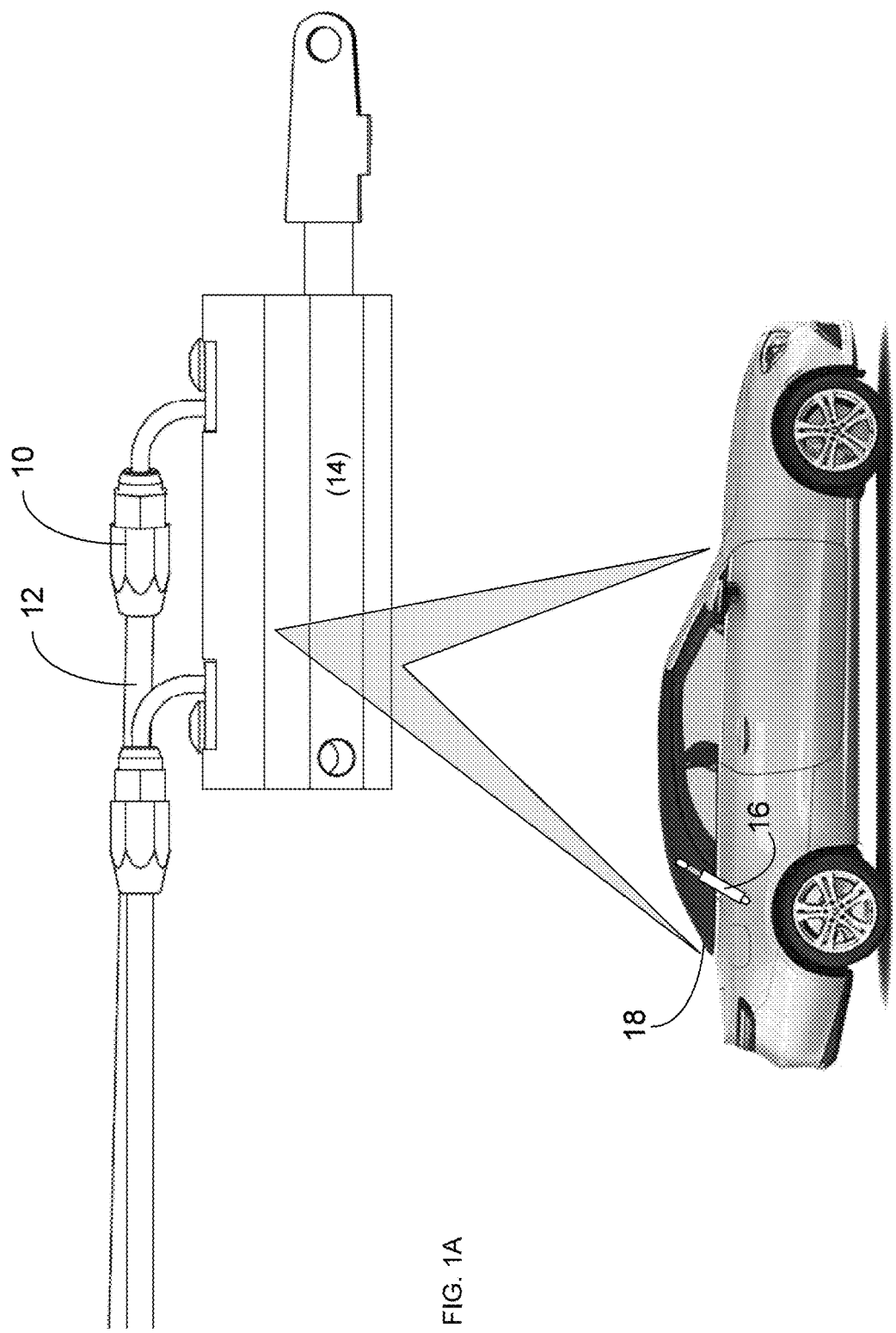

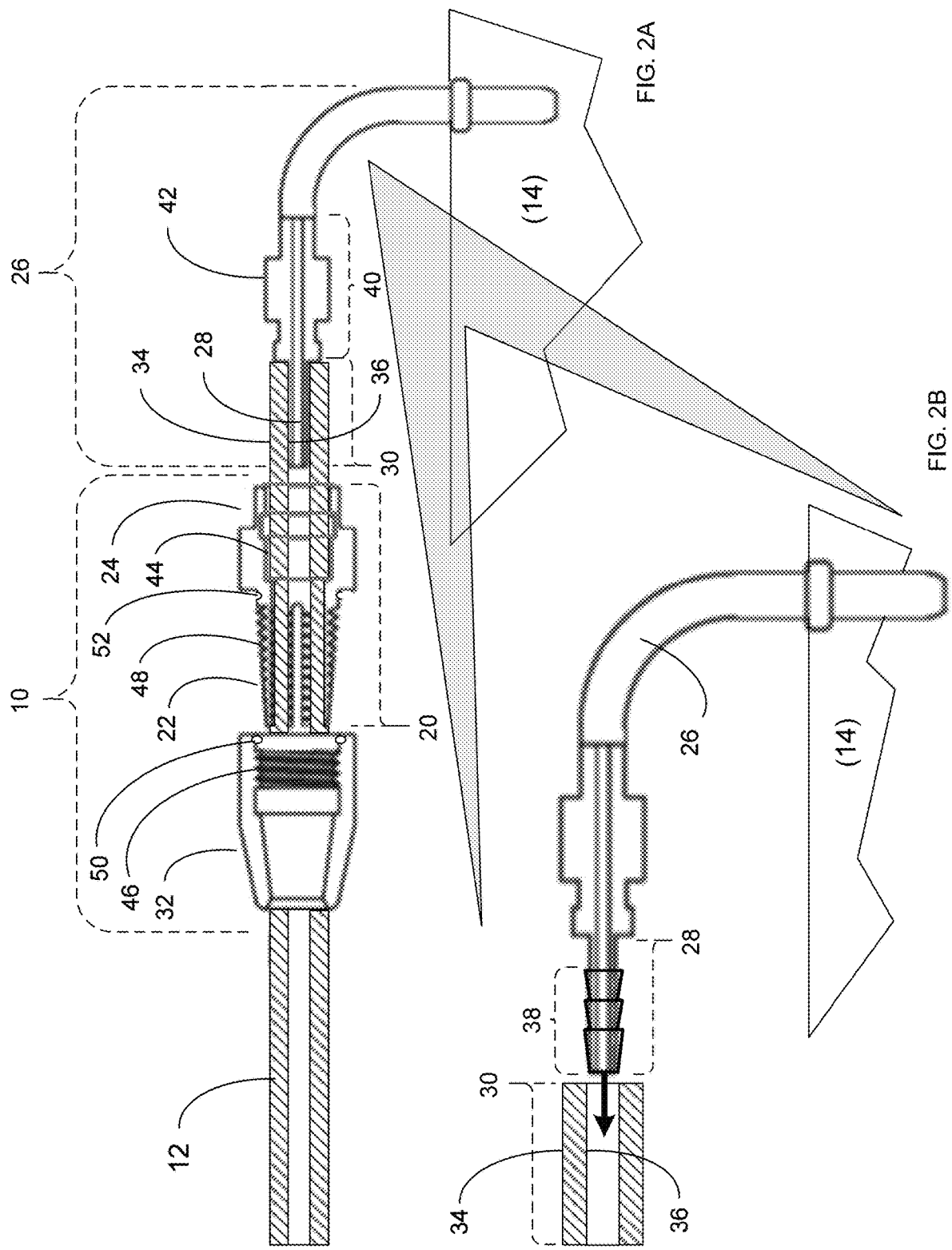

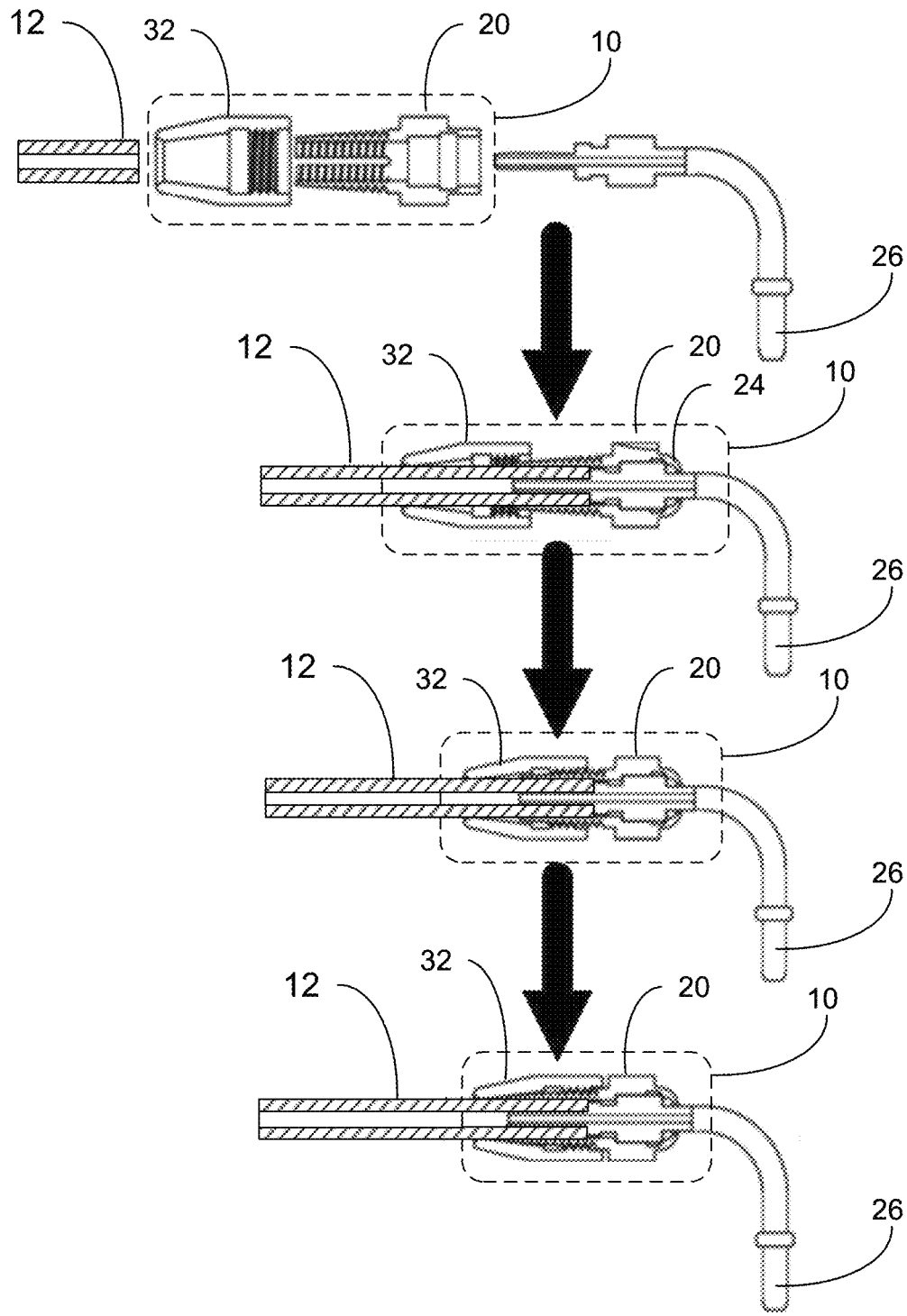

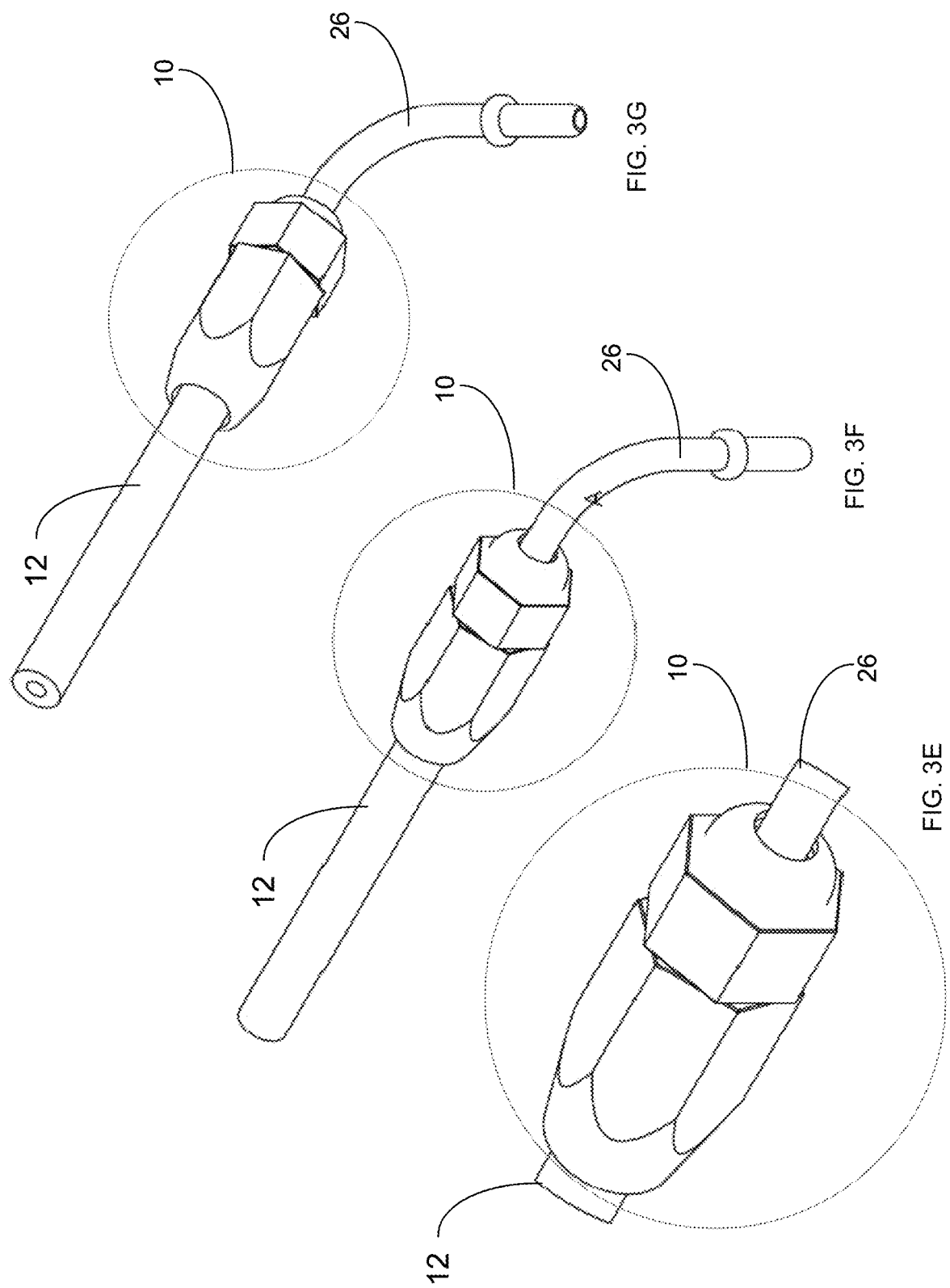

HYDRAULIC COUPLING SYSTEM

RELATED APPLICATION(S)

This application claims the benefit of U.S. Provisional Application No. 63/035,404, filed on 5 Jun. 2020, the entire contents of which are incorporated herein by reference.

TECHNICAL FIELD

This disclosure relates to coupling systems and, more particularly, to hydraulic coupling systems.

BACKGROUND

Hydraulic hoses provide pressurized hydraulic fluid to and from hydraulic cylinders to enable the actuation of the same. Examples of such hydraulic cylinders may include but are not limited to those used to actuate convertible tops in vehicles.

As is known in the art, these hydraulic cylinders include hydraulic seals that prevent leakage of the pressurized fluid contained within these hydraulic cylinders. Due to the passage of time and/or substandard maintenance, these hydraulic seals often fail, resulting in a lack of functionality and hydraulic fluid leaks.

Unfortunately and in certain applications, the hydraulic hoses attached to these hydraulic cylinders are rigidly attached, thus preventing the removal of the hydraulic cylinders (for rebuilding or replacement) without also removing the hydraulic hoses that provide hydraulic fluid to (or receive hydraulic fluid from) the hydraulic cylinders. Examples of such applications may include but are not limited to: the Mercedes R170 SLK-Class, the Mercedes R171 SLK-Class, the Mercedes R230 SL-Class (front lock cylinders), the Ferrari 360 Spider (top frame main seal cylinders) and the Ferrari 430 Spider (top frame main seal cylinders).

SUMMARY OF DISCLOSURE

In one implementation, a hydraulic coupling system is configured to couple a hydraulic hose to a hydraulic cylinder and includes: a compressive adapter assembly including: a first adapter portion configured to receive a portion of the hydraulic hose, and a second adapter portion configured to engage an inlet tube of the hydraulic cylinder, wherein a first tube portion of the inlet tube of the hydraulic cylinder is configured to be received within a portion of the hydraulic hose; and a compressive sleeve assembly configured to engage the compressive adapter assembly and radially compress the first adapter portion of the compressive adapter assembly onto an outer surface of the portion of the hydraulic hose, thus compressing an inner surface of the portion of the hydraulic hose onto the first tube portion of the inlet tube of the hydraulic cylinder.

One or more of the following features may be included. The first tube portion of the inlet tube of the hydraulic cylinder may include one or more surface irregularities configured to engage the inner surface of the portion of the hydraulic hose. The one or more surface irregularities may include one or more of: one or more circumferential barbs; one or more circumferential ridges; and one or more circumferential grooves. The inlet tube of the hydraulic cylinder may include a second tube portion configured to be engaged by the second adapter portion of the compressive adapter assembly. The second tube portion of the inlet tube of the hydraulic cylinder may include a circumferential flange configured to be engaged by the second adapter portion of the compressive adapter assembly. The second adapter portion of the compressive adapter assembly may include a recess configured to receive the circumferential flange of the second tube portion of the inlet tube of the hydraulic cylinder. The second adapter portion of the compressive adapter assembly may be configured to engage the second tube portion of the inlet tube of the hydraulic cylinder via one or more of a: a screw assembly; a pin assembly; a swaging operation; a rolling operation; and a crimping operation. The compressive sleeve assembly may be configured to threadably engage the compressive adapter assembly to radially compress the first adapter portion of the compressive adapter assembly onto the outer surface of the portion of the hydraulic hose. The compressive sleeve assembly may be configured to include a tapered female thread portion and the compressive adapter assembly may be configured to include a complementary tapered male thread portion. The compressive sleeve assembly may be configured to conically engage the compressive adapter assembly to radially compress the first adapter portion of the compressive adapter assembly onto the outer surface of the portion of the hydraulic hose. The compressive sleeve assembly may be configured to include one or more sleeve locking assemblies configured to engage one or more complementary adapter locking assemblies of the compressive adapter assembly. The hydraulic cylinder may be an automotive hydraulic cylinder. The automotive hydraulic cylinder may be configured to: actuate at least of a portion of a convertible roof; latch at least of a portion of the convertible roof; and unlatch at least of a portion of the convertible roof. The hydraulic coupling system may be constructed of one or more of: a composite material; a polymer material; an alloy; aluminum; titanium; carbon steel; stainless steel; and brass.

In another implementation, a hydraulic coupling system is configured to couple a hydraulic hose to an automotive hydraulic cylinder and includes: a compressive adapter assembly including: a first adapter portion configured to receive a portion of the hydraulic hose, and a second adapter portion configured to engage an inlet tube of the automotive hydraulic cylinder, wherein a first tube portion of the inlet tube of the automotive hydraulic cylinder is configured to be received within a portion of the hydraulic hose and includes one or more surface irregularities configured to engage an inner surface of the portion of the hydraulic hose; and a compressive sleeve assembly configured to engage the compressive adapter assembly and radially compress the first adapter portion of the compressive adapter assembly onto an outer surface of the portion of the hydraulic hose, thus compressing the inner surface of the portion of the hydraulic hose onto the first tube portion of the inlet tube of the automotive hydraulic cylinder; wherein the inlet tube of the automotive hydraulic cylinder includes a second tube portion configured to be engaged by the second adapter portion of the compressive adapter assembly.

One or more of the following features may be included. The second tube portion of the inlet tube of the automotive hydraulic cylinder may include a circumferential flange configured to be engaged by the second adapter portion of the compressive adapter assembly. The second adapter portion of the compressive adapter assembly may include a recess configured to receive the circumferential flange of the second tube portion of the inlet tube of the automotive hydraulic cylinder. The compressive sleeve assembly may be configured to threadably engage the compressive adapter assembly to radially compress the first adapter portion of the compressive adapter assembly onto the outer surface of the portion of the hydraulic hose. The compressive sleeve assembly may be configured to conically engage the compressive adapter assembly to radially compress the first adapter portion of the compressive adapter assembly onto the outer surface of the portion of the hydraulic hose.

In another implementation, a hydraulic coupling system is configured to couple a hydraulic hose to an automotive hydraulic cylinder and includes: a compressive adapter assembly including: a first adapter portion configured to receive a portion of the hydraulic hose, and a second adapter portion configured to engage an inlet tube of the automotive hydraulic cylinder, wherein a first tube portion of the inlet tube of the automotive hydraulic cylinder is configured to be received within a portion of the hydraulic hose; and a compressive sleeve assembly configured to engage the compressive adapter assembly and radially compress the first adapter portion of the compressive adapter assembly onto an outer surface of the portion of the hydraulic hose, thus compressing an inner surface of the portion of the hydraulic hose onto the first tube portion of the inlet tube of the automotive hydraulic cylinder, wherein: the compressive sleeve assembly is configured to threadably engage the compressive adapter assembly to radially compress the first adapter portion of the compressive adapter assembly onto the outer surface of the portion of the hydraulic hose, and the compressive sleeve assembly is configured to include a tapered female thread portion and the compressive adapter assembly is configured to include a complementary tapered male thread portion.

One or more of the following features may be included. The first tube portion of the inlet tube of the automotive hydraulic cylinder may include one or more surface irregularities configured to engage the inner surface of the portion of the hydraulic hose. The one or more surface irregularities may include one or more of: one or more circumferential barbs; one or more circumferential ridges; and one or more circumferential grooves.

The details of one or more implementations are set forth in the accompanying drawings and the description below. Other features and advantages will become apparent from the description, the drawings, and the claims.

BRIEF DESCRIPTION OF THE DRAWINGS

FIGS. 1A and 1B are diagrammatic views of a hydraulic coupling system according to an embodiment of the present disclosure;

FIGS. 2A and 2B are diagrammatic views of the hydraulic coupling system of FIG. 1A according to an embodiment of the present disclosure;

FIGS. 3A-3D are diagrammatic views of the hydraulic coupling system of FIG. 1A according to an embodiment of the present disclosure; and FIGS. 3E-3G are isometric views of the hydraulic coupling system of FIG. 1A according to an embodiment of the present disclosure.

Like reference symbols in the various drawings indicate like elements.

DETAILED DESCRIPTION OF THE PREFERRED EMBODIMENTS

Referring to FIGS. 1A-1B, there is shown a hydraulic coupling system (e.g., hydraulic coupling system 10) configured to couple a hydraulic hose (e.g., hydraulic hose 12) to a hydraulic cylinder (e.g., hydraulic cylinder 14). The hydraulic coupling system (e.g., hydraulic coupling system 10) may be constructed of various materials, examples of which may include but are not limited to: a composite material (e.g., carbon fiber); a polymer material (e.g., plastic); an alloy (e.g., magnesium alloy); aluminum; titanium; carbon steel; stainless steel; and brass.

The hydraulic cylinder (e.g., hydraulic cylinder 14) may be an automotive hydraulic cylinder (e.g., automotive cylinder 16), wherein the automotive hydraulic cylinder (e.g., automotive cylinder 16) may be configured to: actuate at least of a portion of a convertible roof (e.g., convertible roof 18); latch at least of a portion of the convertible roof (e.g., convertible roof 18); and unlatch at least of a portion of the convertible roof (e.g., convertible roof 18).

The Hydraulic Coupling System

Referring also to FIGS. 2A-2B, hydraulic coupling system 10 may include a compressive adapter assembly (e.g., compressive adapter assembly 20). Compressive adapter assembly 20 may include: a first adapter portion (e.g., first adapter portion 22) configured to receive a portion of the hydraulic hose (e.g., hydraulic hose 12), and a second adapter portion (e.g., second adapter portion 24) configured to engage an inlet tube (e.g., inlet tube 26) of the hydraulic cylinder (e.g., hydraulic cylinder 14). A first tube portion (e.g., first tube portion 28) of the inlet tube (e.g., inlet tube 26) of the hydraulic cylinder (e.g., hydraulic cylinder 14) may be configured to be received within a portion (e.g., portion 30) of the hydraulic hose (e.g., hydraulic hose 12).

Hydraulic coupling system 10 may include a compressive sleeve assembly (e.g., compressive sleeve assembly 32) configured to engage the compressive adapter assembly (e.g., compressive adapter assembly 20) and radially compress the first adapter portion (e.g., first adapter portion 22) of the compressive adapter assembly (e.g., compressive adapter assembly 20) onto an outer surface (e.g., outer surface 34) of the portion (e.g., portion 30) of the hydraulic hose (e.g., hydraulic hose 12), thus compressing an inner surface (e.g., inner surface 36) of the portion (e.g., portion 30) of the hydraulic hose (e.g., hydraulic hose 12) onto the first tube portion (e.g., first tube portion 28) of the inlet tube (e.g., inlet tube 26) of the hydraulic cylinder (e.g., hydraulic cylinder 14).

The first tube portion (e.g., first tube portion 28) of the inlet tube (e.g., inlet tube 26) of the hydraulic cylinder (e.g., hydraulic cylinder 14) may include one or more surface irregularities (e.g., irregularities 38) configured to engage the inner surface (e.g., inner surface 36) of the portion (e.g., portion 30) of the hydraulic hose (e.g., hydraulic hose 12). Examples of the one or more surface irregularities (e.g., irregularities 38) may include but are not limited to one or more of: one or more circumferential barbs; one or more circumferential ridges; and one or more circumferential grooves.

The inlet tube (e.g., inlet tube 26) of the hydraulic cylinder (e.g., hydraulic cylinder 14) may include a second tube portion (e.g., second tube portion 40) configured to be engaged by the second adapter portion (e.g., second adapter portion 24) of the compressive adapter assembly (e.g., compressive adapter assembly 20).

The second tube portion (e.g., second tube portion 40) of the inlet tube (e.g., inlet tube 26) of the hydraulic cylinder (e.g., hydraulic cylinder 14) may include a circumferential flange (e.g., circumferential flange 42) configured to be engaged by the second adapter portion (e.g., second adapter portion 24) of the compressive adapter assembly (e.g., compressive adapter assembly 20).

The second adapter portion (e.g., second adapter portion 24) of the compressive adapter assembly (e.g., compressive adapter assembly 20) may include a recess (e.g., recess 44) configured to receive the circumferential flange (e.g., circumferential flange 42) of the second tube portion (e.g., second tube portion 40) of the inlet tube (e.g., inlet tube 26) of the hydraulic cylinder (e.g., hydraulic cylinder 14).

The second adapter portion (e.g., second adapter portion 24) of the compressive adapter assembly (e.g., compressive adapter assembly 20) may be configured to engage the second tube portion (e.g., second tube portion 40) of the inlet tube (e.g., inlet tube 26) of the hydraulic cylinder (e.g., hydraulic cylinder 14) via one or more of: a screw assembly (not shown); a pin assembly (not shown); a swaging operation; a rolling operation; and a crimping operation. As is known in the art, a swaging operation is a forming process in which compressive forces are used to deform and manipulate the shape of a workpiece via a die. As is known in the art, a rolling operation is a forming process in which rollers are used to exert compressive forces to deform and manipulate the shape of a workpiece. As is known in the art, a crimping operation is a deformation process in which two or more pieces of metal or other ductile material are joined by deforming one or both of them so that they are coupled.

The compressive sleeve assembly (e.g., compressive sleeve assembly 32) may be configured to threadably engage the compressive adapter assembly (e.g., compressive adapter assembly 20) to radially compress the first adapter portion (e.g., first adapter portion 22) of the compressive adapter assembly (e.g., compressive adapter assembly 20) onto the outer surface (e.g., outer surface 34) of the portion (e.g., portion 30) of the hydraulic hose (e.g., hydraulic hose 12).

For example, the compressive sleeve assembly (e.g., compressive sleeve assembly 32) may be configured to include a tapered female thread portion (e.g., tapered female thread portion 46) and the compressive adapter assembly (e.g., compressive adapter assembly 20) may be configured to include a complementary tapered male thread portion (e.g., tapered male thread portion 48).

Alternatively, the compressive sleeve assembly (e.g., compressive sleeve assembly 32) may be configured to conically engage the compressive adapter assembly (e.g., compressive adapter assembly 20) to radially compress the first adapter portion (e.g., first adapter portion 22) of the compressive adapter assembly (e.g., compressive adapter assembly 20) onto the outer surface (e.g., outer surface 34) of the portion (e.g., portion 30) of the hydraulic hose (e.g., hydraulic hose 12).

For example, the compressive sleeve assembly (e.g., compressive sleeve assembly 32) may be configured to include one or more sleeve locking assemblies (e.g., sleeve locking assemblies 50) configured to engage one or more complementary adapter locking assemblies (e.g., adapter locking assemblies 52) of the compressive adapter assembly (e.g., compressive adapter assembly 20). Accordingly, the one or more sleeve locking assemblies (e.g., sleeve locking assemblies 50) may be spring-loaded protrusions that retract when the compressive sleeve assembly (e.g., compressive sleeve assembly 32) is being pressed onto the compressive adapter assembly (e.g., compressive adapter assembly 20). And, upon alignment with the complementary adapter locking assemblies (e.g., adapter locking assemblies 52) of the compressive adapter assembly (e.g., compressive adapter assembly 20), the one or more sleeve locking assemblies (e.g., sleeve locking assemblies 50) may protrude outward and engage the complementary adapter locking assemblies (e.g., adapter locking assemblies 52) of the compressive adapter assembly (e.g., compressive adapter assembly 20), thus locking the compressive sleeve assembly (e.g., compressive sleeve assembly 32) and the compressive adapter assembly (e.g., compressive adapter assembly 20) together.

Assembling the Hydraulic Coupling System

Referring also to FIGS. 3A-3D, there is shown an illustrative example of the manner in which hydraulic coupling system 10 may be assembled.

FIG. 3A: At this point of assembly, all of the components of hydraulic coupling system 10 are shown disassembled. For example, compressive sleeve assembly 32 of hydraulic coupling system 10 is shown separated from compressive adapter assembly 20 of hydraulic coupling system 10. Further, neither hydraulic hose 12 nor inlet tube 26 of hydraulic cylinder 14 are shown coupled to hydraulic coupling system 10.

FIG. 3B: At this point of assembly, hydraulic hose 12 is inserted through compressive sleeve assembly 32 and the end of hydraulic hose 12 is inserted onto inlet tube 26. Further, second adapter portion 24 of compressive adapter assembly 20 is shown to be coupled to inlet tube 26 via e.g., a swaging operation.

FIG. 3C: At this point of assembly, compressive sleeve assembly 32 is being threaded onto compressive adapter assembly 20, thus radially compressing compressive adapter assembly 20 onto the outer surface of hydraulic hose 12, which in turn radially compresses the inner surface of hydraulic hose 12 onto inlet tube 26 of hydraulic cylinder 14.

FIG. 3D: At this point of assembly, hydraulic coupling system 10 is shown completely assembled, as compressive sleeve assembly 32 has been fully threaded onto compressive adapter assembly 20.

Referring also to FIGS. 3E-3G, there is shown various isometric illustrations of hydraulic coupling system 10 in a fully assembled configuration.

General

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A hydraulic coupling system configured to couple a hydraulic hose to a hydraulic cylinder, the hydraulic coupling system comprising:
   a compressive adapter assembly including:
      a first adapter portion configured to receive a portion of the hydraulic hose, and
      a second adapter portion configured to engage an inlet tube of the hydraulic cylinder, wherein a first tube portion of the inlet tube of the hydraulic cylinder is configured to be received within the portion of the hydraulic hose, and the second adapter portion is permanently deformable around the inlet tube to permanently retain the second adapter portion with respect to the inlet tube; and
   a compressive sleeve assembly configured to engage the compressive adapter assembly and radially compress the first adapter portion of the compressive adapter assembly onto an outer surface of the portion of the hydraulic hose, thus compressing an inner surface of the portion of the hydraulic hose onto the first tube portion of the inlet tube of the hydraulic cylinder.

2. The hydraulic coupling system of claim 1 wherein the first tube portion of the inlet tube of the hydraulic cylinder includes one or more surface irregularities configured to engage the inner surface of the portion of the hydraulic hose.

3. The hydraulic coupling system of claim 2 wherein the one or more surface irregularities includes one or more of:
   one or more circumferential barbs;
   one or more circumferential ridges; and
   one or more circumferential grooves.

4. The hydraulic coupling system of claim 1 wherein the inlet tube of the hydraulic cylinder includes a second tube portion configured to be engaged by the second adapter portion of the compressive adapter assembly.

5. The hydraulic coupling system of claim 4 wherein the second tube portion of the inlet tube of the hydraulic cylinder includes a circumferential flange configured to be engaged by the second adapter portion of the compressive adapter assembly.

6. The hydraulic coupling system of claim 5 wherein the second adapter portion of the compressive adapter assembly includes a recess configured to receive the circumferential flange of the second tube portion of the inlet tube of the hydraulic cylinder.

7. The hydraulic coupling system of claim 4 wherein the second adapter portion of the compressive adapter assembly is configured to engage the second tube portion of the inlet tube of the hydraulic cylinder via one or more of a:
   a swaging operation;
   a rolling operation; and
   a crimping operation.

8. The hydraulic coupling system of claim 1 wherein the compressive sleeve assembly is configured to threadably engage the compressive adapter assembly to radially compress the first adapter portion of the compressive adapter assembly onto the outer surface of the portion of the hydraulic hose.

9. The hydraulic coupling system of claim 8 wherein the compressive sleeve assembly is configured to include a tapered female thread portion and the compressive adapter assembly is configured to include a complementary tapered male thread portion.

10. The hydraulic coupling system of claim 1 wherein the compressive sleeve assembly is configured to conically engage the compressive adapter assembly to radially compress the first adapter portion of the compressive adapter assembly onto the outer surface of the portion of the hydraulic hose.

11. The hydraulic coupling system of claim 10 wherein the compressive sleeve assembly is configured to include one or more sleeve locking assemblies configured to engage one or more complementary adapter locking assemblies of the compressive adapter assembly.

12. The hydraulic coupling system of claim 1 wherein the hydraulic cylinder is an automotive hydraulic cylinder.

13. The hydraulic coupling system of claim 12 wherein the automotive hydraulic cylinder is configured to:
   actuate at least of a portion of a convertible roof;
   latch at least of a portion of the convertible roof; and
   unlatch at least of a portion of the convertible roof.

14. The hydraulic coupling system of claim 1 wherein the hydraulic coupling system is constructed of one or more of:
   a composite material;
   a polymer material;
   an alloy;
   aluminum;
   titanium;
   carbon steel;
   stainless steel; and
   brass.

15. A hydraulic coupling system configured to couple a hydraulic hose to an automotive hydraulic cylinder, the hydraulic coupling system comprising:
   a compressive adapter assembly including:
      a first adapter portion configured to receive a portion of the hydraulic hose, and
      a second adapter portion configured to engage an inlet tube of the automotive hydraulic cylinder, wherein a first tube portion of the inlet tube of the automotive hydraulic cylinder is configured to be received within the portion of the hydraulic hose and includes one or more surface irregularities configured to directly engage an inner surface of the portion of the hydraulic hose; and
   a compressive sleeve assembly configured to engage the compressive adapter assembly and radially compress the first adapter portion of the compressive adapter assembly onto an outer surface of the portion of the hydraulic hose, thus compressing the inner surface of the portion of the hydraulic hose onto the first tube portion of the inlet tube of the automotive hydraulic cylinder;
   wherein the inlet tube of the automotive hydraulic cylinder includes a second tube portion configured to be engaged by the second adapter portion of the compressive adapter assembly, wherein the second adapter portion is permanently deformable around the inlet tube to permanently retain the second adapter portion with respect to the inlet tube.

16. The hydraulic coupling system of claim 15 wherein the second tube portion of the inlet tube of the automotive hydraulic cylinder includes a circumferential flange configured to be engaged by the second adapter portion of the compressive adapter assembly.

17. The hydraulic coupling system of claim 16 wherein the second adapter portion of the compressive adapter assembly includes a recess configured to receive the circumferential flange of the second tube portion of the inlet tube of the automotive hydraulic cylinder.

18. The hydraulic coupling system of claim 15 wherein the compressive sleeve assembly is configured to threadably engage the compressive adapter assembly to radially compress the first adapter portion of the compressive adapter assembly onto the outer surface of the portion of the hydraulic hose.

19. The hydraulic coupling system of claim 15 wherein the compressive sleeve assembly is configured to conically engage the compressive adapter assembly to radially compress the first adapter portion of the compressive adapter assembly onto the outer surface of the portion of the hydraulic hose.

20. A hydraulic coupling system configured to couple a hydraulic hose to an automotive hydraulic cylinder, the hydraulic coupling system comprising:
   a compressive adapter assembly including:
      a first adapter portion configured to receive a portion of the hydraulic hose, and
      a second adapter portion configured to engage an inlet tube of the automotive hydraulic cylinder, wherein a first tube portion of the inlet tube of the automotive hydraulic cylinder is configured to be received within a portion of the hydraulic hose, and the second adapter portion is permanently deformable around the inlet tube to permanently retain the second adapter portion with respect to the inlet tube; and
   a compressive sleeve assembly configured to engage the compressive adapter assembly and radially compress the first adapter portion of the compressive adapter assembly onto an outer surface of the portion of the hydraulic hose, thus compressing an inner surface of the portion of the hydraulic hose onto the first tube portion of the inlet tube of the automotive hydraulic cylinder, wherein:
      the compressive sleeve assembly is configured to threadably engage the compressive adapter assembly to radially compress the first adapter portion of the compressive adapter assembly onto the outer surface of the portion of the hydraulic hose, and
      the compressive sleeve assembly is configured to include a tapered female thread portion and the compressive adapter assembly is configured to include a complementary tapered male thread portion.

21. The hydraulic coupling system of claim 20 wherein the first tube portion of the inlet tube of the automotive hydraulic cylinder includes one or more surface irregularities configured to engage the inner surface of the portion of the hydraulic hose.

22. The hydraulic coupling system of claim 21 wherein the one or more surface irregularities includes one or more of:
   one or more circumferential barbs;
   one or more circumferential ridges; and
   one or more circumferential grooves.

* * * * *